US006036358A

United States Patent [19]
Montrose

[11] Patent Number: 6,036,358
[45] Date of Patent: Mar. 14, 2000

[54] SYSTEM AND METHOD FOR DIAGNOSING MECHANICAL CLOCKS

[75] Inventor: Charles J. Montrose, Clintondale, N.Y.

[73] Assignee: International Business Machines Corporation, Armonk, N.Y.

[21] Appl. No.: 09/135,636

[22] Filed: Aug. 17, 1998

[51] Int. Cl.[7] .......................... G04B 15/00; G04B 17/04; G04F 5/00; G01C 17/38

[52] U.S. Cl. .......................... 368/134; 368/165; 368/179; 73/1.43; 73/1.48

[58] Field of Search .............................. 368/10, 134–138, 368/165–166, 179–183; 73/1.43, 1.48

[56] References Cited

U.S. PATENT DOCUMENTS

| | | | |
|---|---|---|---|
| 3,955,409 | 5/1976 | Moser et al. | 73/99 |
| 3,960,344 | 6/1976 | Dugan | 244/182 |
| 4,395,137 | 7/1983 | Wiley | 368/179 |
| 4,723,233 | 2/1988 | Beerg | 368/76 |

*Primary Examiner*—Vit Miska
*Attorney, Agent, or Firm*—Ratner & Prestia; Tiffany L. Townsend

[57] ABSTRACT

A system and method are provided for calculating the period of a mechanical clock while minimizing the effects of extraneous noise. The method of the invention senses three sounds from the clock and calculates the period of the clock based on those three sounds. The method defines a blanking period between the first and the second sounds and the second and the third sounds. During this blanking period, the method ignores all sound to prevent such sound from being mistaken for sounds from the clock. The method also defines an expected time interval between sounds from the clock. The system senses the beats of a mechanical clock while minimizing noise. The system includes a pick-up device, an amplifier coupled to the pick-up device, and a microcontroller configured to control the gain of the amplifier so that the expected time delay interval becomes approximately equal to the actual time interval, thereby minimizing noise. The system also supports a mode in which the durations of two consecutive half-periods are compared to assess their uniformity.

16 Claims, 5 Drawing Sheets

SYSTEM AND METHOD FOR DIAGNOSING MECHANICAL CLOCKS

TECHNICAL FIELD

This invention relates generally to the field of diagnosing and regulating mechanical clocks, and specifically to minimizing the impact of noise on such diagnosis and regulation.

BACKGROUND OF THE INVENTION

There are a number of things one must do initially to set up a mechanical clock. First, attention must be given to the action of escapement. Then the clock needs to be put in beat. Finally, the clock needs to be regulated. In checking the action of escapement, the ear of the horological restorer is the best instrument to use in verifying that the clock is running and operating properly. This verification of the proper operation of the clock is limited, however, by the sensitivity of the ears of the restorer. When putting the clock in beat, the restorer uses his or her ear to make a judgment of the equality of time between beats. The accuracy of this phase of the setup is also restricted by the sensitivity of the ears of the restorer.

The real challenge comes when it is time to regulate the clock. This is a procedure that can often continue over the course of several days, weeks, or even months. The procedure involves setting the clock to match the time of some accepted standard time, allowing the clock to run for a length of time, rechecking the clock against the standard, adjusting the rate regulating mechanism, and finally resetting the time. The procedure is time consuming and is hampered by the limitations of the human senses.

A need exists in the art for an electronic system and method that automatically senses and records each beat from the clock, allowing for precise calculations of the parameters relevant to the operation of the clock, such as its pendulum period.

SUMMARY OF THE INVENTION

An object of the present invention is to provide a system and method that can recognize and reject noise while calculating relevant clock parameters. A more specific object of the present invention is to provide a method for calculating the period of the pendulum of a mechanical clock while minimizing extraneous noise. Another object of the present invention is to provide a method for optimizing the gain of an amplifier configured to amplify an electronic signal representing a periodic sound from a mechanical clock. Still another object of the present invention is to provide a system for sensing the beats of a mechanical clock while minimizing noise.

To achieve these and other objects, and in view of its purposes, the present invention provides a method for calculating the period of the pendulum of a mechanical clock while minimizing extraneous noise. The method comprises the steps of: (1) defining a blanking period during which no sounds are picked up by a receiver; (2) sensing the first beat of the clock; (3) ignoring any sound during the blanking period; (4) after the blanking period has elapsed, sensing a second beat of the clock; (5) calculating the first half-period of the clock; (6) sensing a third beat of the clock after another blanking period defining a second period and (7) calculating the period based on the sum of the two half-periods.

The present invention also provides a method for optimizing the gain of an amplifier configured to amplify an electronic signal representing a periodic sound from a mechanical clock. This method comprises the steps of: (1) setting an expected time interval between consecutive beats from the clock; (2) sensing the first beat of the clock, (3) calculating the expected time of arrival for a second beat of the clock by adding the expected time interval to the first beat; (4) sensing a second beat of the clock; (5) comparing the expected time of arrival of the second beat to the actual time at which the second beat arrived; and (6) adjusting the gain of the amplifier to adjust the time at which the second sound is sensed. The gain of the amplifier is adjusted by increasing the gain of the amplifier if the second beat is sensed later than expected and decreasing the gain of the amplifier if the second beat is sensed sooner than expected. The above steps are then repeated until the second instant at which the second sound is sensed is approximately the same at the expected time of arrival.

The present invention also provides a system for sensing the beats of a mechanical clock while minimizing noise. This system includes: (1) a pick-up device configured to receive sound from a mechanical clock and to convert the sound to an electrical signal; (2) an amplifier coupled to the pick-up device to receive the electrical signal; and (3) a microcontroller coupled to the output terminal of the amplifier to receive the amplified electrical signal and configured to control the gain of the amplifier. The amplifier is configured with an adjustable gain and includes an output terminal for providing an amplified electrical signal. The microcontroller is programmed to set an expected time delay interval between consecutive beats of the mechanical clock, sense an actual time interval between a first sound and a second sound, compare the expected time delay interval to the actual time interval between the first sound and the second sound, and adjust the gain of the amplifier so that the expected time delay interval becomes approximately equal to the actual time interval, thereby reducing the impact of noise.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. Included in the drawing are the following figures.

DETAILED DESCRIPTION OF EXEMPLARY EMBODIMENTS

Figure 1:
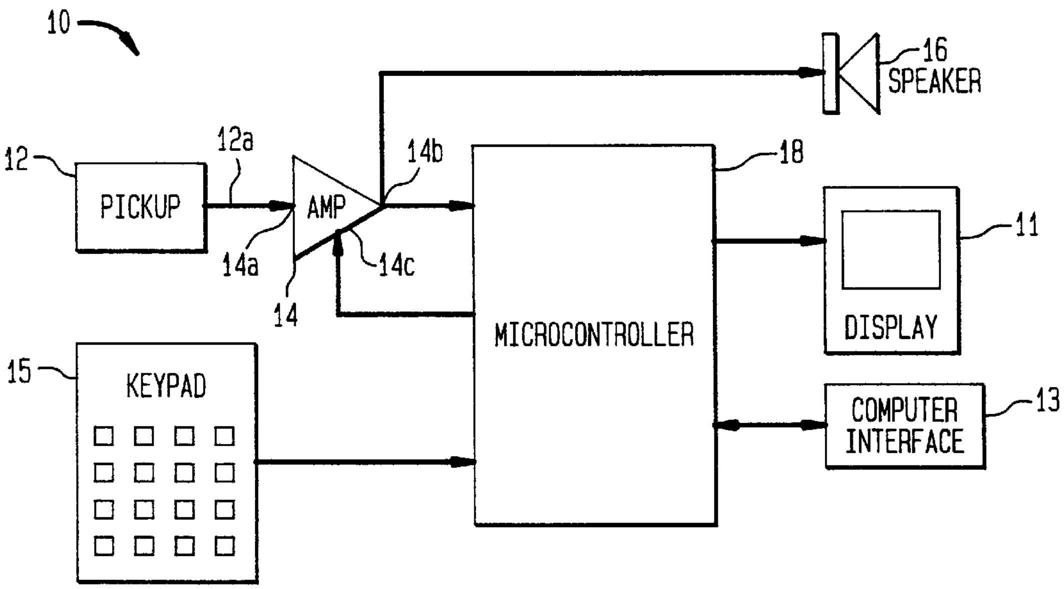
FIG. 1 is a schematic of the components of the present invention.

Referring now to the drawings, wherein like reference numerals refer to like steps and elements throughout, FIG. 1 is a schematic diagram of an exemplary system constructed in accordance with the invention. The system 10 includes a pickup device 12, an amplifier 14, a speaker 16, a keypad 15, a display 11, a computer interface 13, and a microcontroller 18.

The pickup device 12 senses vibrations from sounds or movements generated by the clock and converts those vibrations into electrical signals. These electrical signals are transmitted from the pickup device 12 on an output terminal 12*a*. Suitable pickup devices 12 are commercially available, such as the TIMETRAX model 20 clip-on sensor.

The amplifier 14 includes an input terminal 14*a*, an output terminal 14*b*, and a gain terminal 14*c*. The amplifier 14 receives the electrical signals from the pickup device 12 through the input terminal 14*a*. The amplifier 14 amplifies the electrical signals by an amount dictated by a signal received through gain terminal 14*c*. The amplified signal is output through output terminal 14*b*. Suitable amplifiers 14 are commercially available, such as an op-amp model LMC-66OC available from National Semiconductor, and a digital potentiometer model AD8403-10 available from Analog Devices, Inc.

The microcontroller 18 controls the sensitivity or gain of the amplifier 14 by increasing or decreasing the gain settings, ranging from 0 to 255. The gain settings are defined on an arbitrary scale built into the amplifier 14. If the gain is increased, the amplifier 14 becomes more sensitive and senses a greater number of faint sounds emanating from the clock and its surrounding area. If the gain is decreased, the amplifier 14 becomes less sensitive and, as a result, senses fewer faint sounds emanating from the clock and its surrounding area.

The speaker 16 is coupled to the amplifier output terminal 14*b*. Speaker 16 allows a user to hear the sounds from the clock as sensed by the pickup device 12 and as amplified by the amplifier 14. By listening to the speaker 16, the clock restorer can take a "first cut" at setting the gain of the amplifier 14 to pick up all the sounds from the clock, while avoiding as much noise as possible.

The keypad 15 is provided to allow the user to interact with the system 10. In this manner, the user can enter parameters into the system 10, such as to customize its operation depending on the analysis being performed by the user.

The display 11 allows the user to view the results of operations performed by the system 10, and allows the user to check the status of input parameters as entered through keypad 15. Display 11 is an LCD or LED readout, depending on the circumstances of a given application. Suitable displays 11 are commercially available, such as a Hitachi LM575.

The computer interface 13 allows a user to connect the system 10 to an external computer, such as a portable personal computer. In this manner, the user can download new microcode to the microcontroller 18 the system 10, or can upload the results of calculations performed by the system 10. A suitable computer interface 13 would be a conventional RS-232 serial port, although other communication protocols suitable for exchanging data between two computer systems are equally suitable.

The microcontroller 18 is coupled to the amplifier output terminal 14*b* to receive the output of the amplifier 14. In this manner, the microcontroller 18 senses sounds, or edges, from the clock through the pickup 12 and the amplifier 14. The microcontroller 18 is also coupled to control the gain of amplifier 14 through the gain terminal 14*c*. As described in more detail below, the microcontroller 18 can be configured to calculate the optimal gain of amplifier 14. The microcontroller 18 is coupled to the display 11 to provide output to the user, and is coupled to the computer interface 13 to exchange data with an external computer, such as to upload calculations or to download new microcode. A suitable microcontroller is the MC68HC11E2 manufactured by Motorola Corporation.

Figure 2:
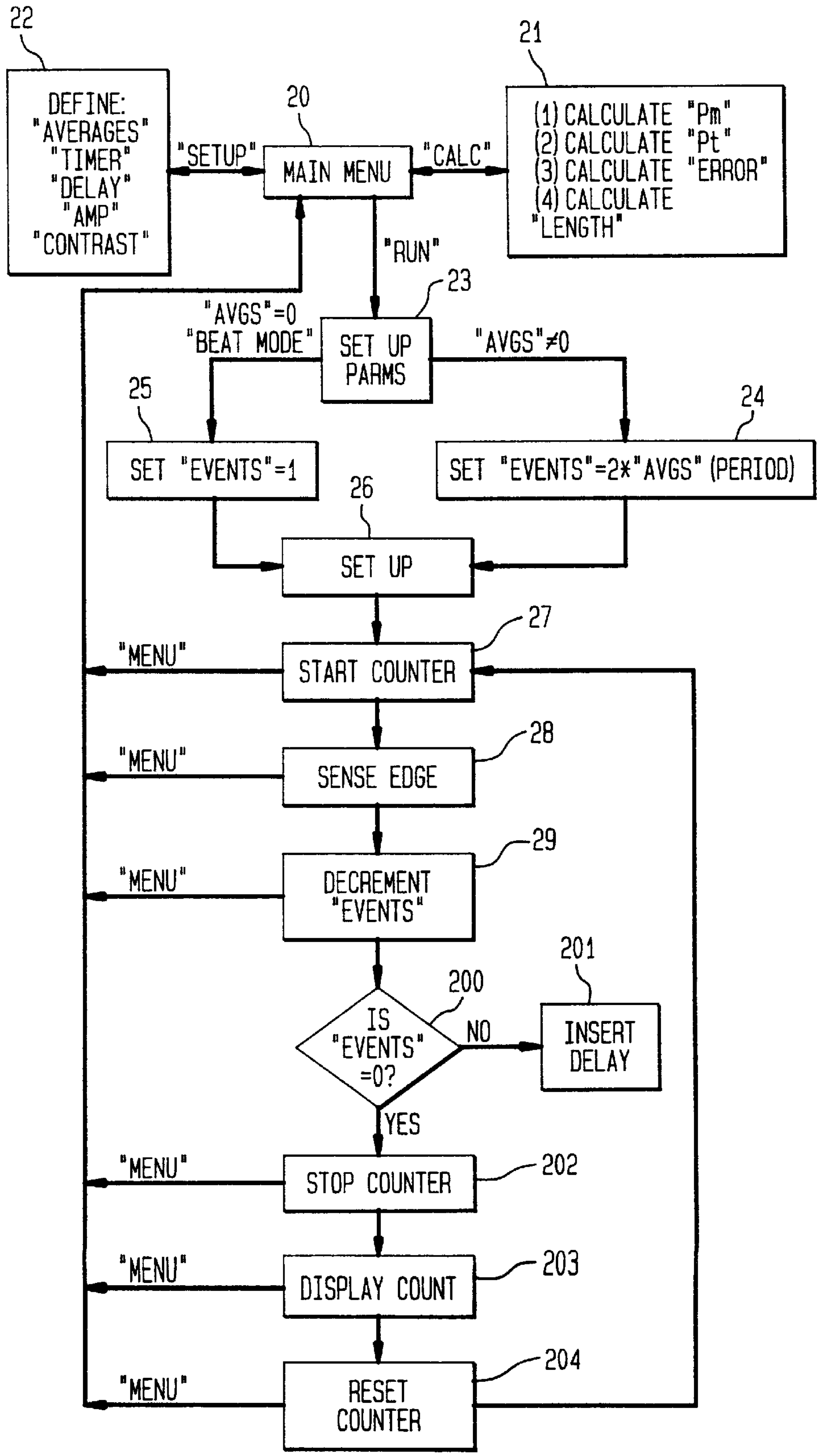
FIG. 2 is a detailed block diagram illustrating the different functions of the microcontroller of the present invention.

FIG. 2 is a high-level flowchart of the operation of the microcontroller 18.

In the discussion below, the period of the pendulum is defined as the time interval required for it to swing from its leftward extreme to its rightward extreme and back to its leftward extreme, or vice versa. Thus, one period includes two half-periods. In FIG. 2, the gain of the amplifier 14 is set manually.

The main menu 20 of the microcontroller 18 has three separate functions. In the "Calc" function shown in block 21, the microcontroller 18 is programmed to:

use the measured pendulum period (Pm);

calculate the theoretical pendulum period (Pt) that will make the clock keep perfect time;

calculate the number of minutes per day that the clock will run fast or slow based on the measured and theoretical pendulum periods; and calculate the length by which the pendulum must be lengthened or shortened to make the measured and theoretical pendulum periods equal.

Referring to function (1) listed in block 21, the measured pendulum period (Pm) is readily available by measuring the time intervals between three consecutive beats. For example, the interval between a first and a second beat defines a first half-period, and the interval between the second beat and a third beat defines a second half-period. The measured pendulum period (Pm) equals the sum of the first and second half-periods.

Referring to function (2) in block 21, the theoretical pendulum period (Pt) that will make the clock keep correct time is given by equation (1):

$$Pt=Pm^{*}\left((Er/86400)+1\right), \tag{1}$$

where Er represents the error in the time kept by the clock in terms of seconds/Day, and where Pm represents the measured pendulum period of the clock. If the error (Er) and the measured pendulum period (Pm) are defined empirically (by direct measurement or observation), then equation (1) yields the theoretical period (Pt). The error (Er) can be measured empirically by letting the clock run for a period of time, and then comparing the elapsed time shown by the clock with a standard time. The difference between the standard time and the elapsed time shown by the clock defines the error. The measured pendulum period (Pm) can be defined empirically by measuring the time between consecutive sounds from the clock.

Referring to function (3) in block 21, the error (Er) in the time kept by the clock over a time interval can be calculated directly if the theoretical pendulum period (Pt) and the measured pendulum period (Pm) are empirically defined. The theoretical pendulum period (Pt) can be defined empirically by counting the teeth on the wheels of the clock, and the measured pendulum period (Pm) can be defined empirically by measuring the time between consecutive sounds from the clock. Therefore, the Error (Er) that a clock will accumulate over time when running at the measured pendulum period Pt is given by equation (2):

$$Er=86400^{*}((Pt/Pm)-1). \tag{2}$$

Equation 2 is derived by solving equation 1 for Er. If the error has a positive value, the clock is running faster than a standard time. If the Error has a negative value, then the clock is running slower than a standard time.

Referring to function (4) in block 21, if both the theoretical pendulum period (Pt) and the measured pendulum period (Pm) are calculated or are empirically defined, the change in pendulum length (DEL) that will make the measured pendulum period (Pm) equal the theoretical pendulum period (Pt) is given by equation (3):

$$DEL=(g/4*PI^2)*(Pt^2-Pm^2), \quad (3)$$

where g=32.2 ft/$s^2$ and PI=3.1414. If DEL has a positive value, the pendulum should be lengthened by that value to make Pm equal Pt and allow the clock to keep proper time. If DEL is a negative value, the pendulum should be shortened by that value to make Pm equal Pt, thereby allowing the clock to keep proper time.

Proceeding to the "Setup" function shown in block 22 of FIG. 2, the microcontroller 18 is configured to receive the following variables from the user. The "Averages" variable defines the number of times that the pendulum period is sampled and calculated, and ranges between 0 and 127. The "Timer" variable controls the gain of the amplifier 14 and ranges within an arbitrary scale built into the amplifier 14, such as between 0 and 255. The "Delay" variable controls a blanking or delay period between periodic sounds during which the microcontroller 18 ignores signals from the pickup 12, as explained furthre below. The "Delay" variable ranges from 0.1 to 25.5 seconds in 0.1 second increments. The "Amp" variable controls the amplification of the speaker 16 and ranges within an arbitrary scale, such as between 0 and 255. The "amp" variable allows the user to hear more clearly the sounds that the clock generates. The ranges of values for "amp" and "timer" represent exemplary and arbitrary scales of amplification supported by the amplifier chosen to practice the invention. The "Contrast" variable controls parameters relevant to the display 11, such as the contrast if a liquid crystal display is chosen as the display 11.

Proceeding to the "Run" function beginning at block 23, the microcontroller 18 assigns and sets up the variables received above in the "set up" function (block 22). Also at block 23, the microcontroller 18 evaluates the "Averages" variable. If the "Averages" variable is zero, then the microcontroller 18 operates in the "beat mode" and the value of the "events" variable is set at 1, as shown in block 25. If the "Averages" variable is a number greater then zero, then the value of the "events" variable is set at "2*Averages," as shown in block 24, and the microcontroller 18 operates in a "normal" mode rather than in "beat" mode. In either case, the "Events" variable represents the number of pendulum half-periods that are sampled by the system 10.

The "beat mode" is used to evaluate the uniformity of the two half-periods that comprise a full pendulum period of the mechanical clock. Typically, a clock restorer uses the "beat mode" as a preliminary adjustment of the clock before using the "normal" mode to evaluate the long-term accuracy of the clock. In this manner, the clock restorer adjusts the clock so that the two half-periods are approximately equal before allowing the clock to run in "Normal" mode to evaluate its accuracy in keeping time. In "beat mode," the microcontroller 18 displays the two half-periods one at a time so that the user can readily compare the two half-periods. once the two half-periods are approximately equal, the user switches to "normal" mode by setting the "Averages" variable to some value greater than zero.

In "normal" mode, the microcontroller 18 tracks whole pendulum periods rather than half-periods. In this manner, the "Averages" variable represents the number of times that the period of the pendulum is sampled and calculated by the microcontroller 115. For each time that the pendulum period is sampled and calculated, there must be two "events" or pendulum half-periods, with each pendulum half-period defined by two consecutive sounds. By choosing "averages" to be a sufficiently high number, the user can allow the system 10 to run over a time interval to evaluate the lengths of several pendulum periods and to check the clock's accuracy over that time interval.

At block 26, the "events" variable defined in either step 25 or 24 is assigned. This "events" variable controls how many times steps 28, 29, 200 and 201 are executed.

At block 27, the microcontroller 18 assigns the "events" variable to a loop counter. This loop counter controls the number of times that the microcontroller 18 senses and calculates a half-period of the clock pendulum. Also, the microcontroller 18 starts a counter to track the amount of time elapsing while the number of samplings indicated by the "averages" variable are taken.

At block 28, the pickup device 12 senses a vibration caused by sound or movement. Such vibrations are called hereinafter "edges." The edge may be a periodic sound emanating from the clock itself, or may be noise emanating from the surroundings of the clock.

After the edge is sensed in block 28, the "events" variable is decremented at block 29. In this manner, microcontroller 18 tracks how many edges have been received from the clock or its surroundings.

At block 200, the microcontroller 18 d etermines whether the "events" variable is zero. If the "events" variable is not zero, then the microcontroller 18 proceeds to block 201, inserting a blanking period during which the microcontroller 18 ignores input from the pickup 12. During the blanking period, the microcontroller 18 delays further processing, and does not sense another edge until after the blanking period expires. The duration of the blanking period is determined by the "Timer" variable input in block 22. When the blanking period expires, the microcontroller 18 returns to block 28 to sense a next edge. The time duration between two consecutive edges defines a first one-half of the period of the clock.

At block 202, the counter is stopped when the events number becomes zero. At this point, the counter has tracked the total time elapsing while the number of period samplings dictated by the "averages" variable are taken. For example, if "averages" was set to one, then the counter started in block 27 and stopped in block 202 would indicate the duration of one period. If "averages" is set to some value X, then the average pendulum period equals the value stored in the counter divided by X.

At block 203, the value accumulated in the counter is displayed to the user of display 11.

At block 210, the counter is reset for the next measurement of the pendulum period, and the microcontroller 18 returns to block 27 to re-start the counter.

As indicated by the arrows labeled "Menu," the microcontroller 18 can be interrupted to return to the main menu 20 to accept user input. In this manner, when the microcontroller 18 is executing in blocks 27, 28, 29, 202, 203, or 204, then the user can interrupt microcontroller 18.

Figure 3:
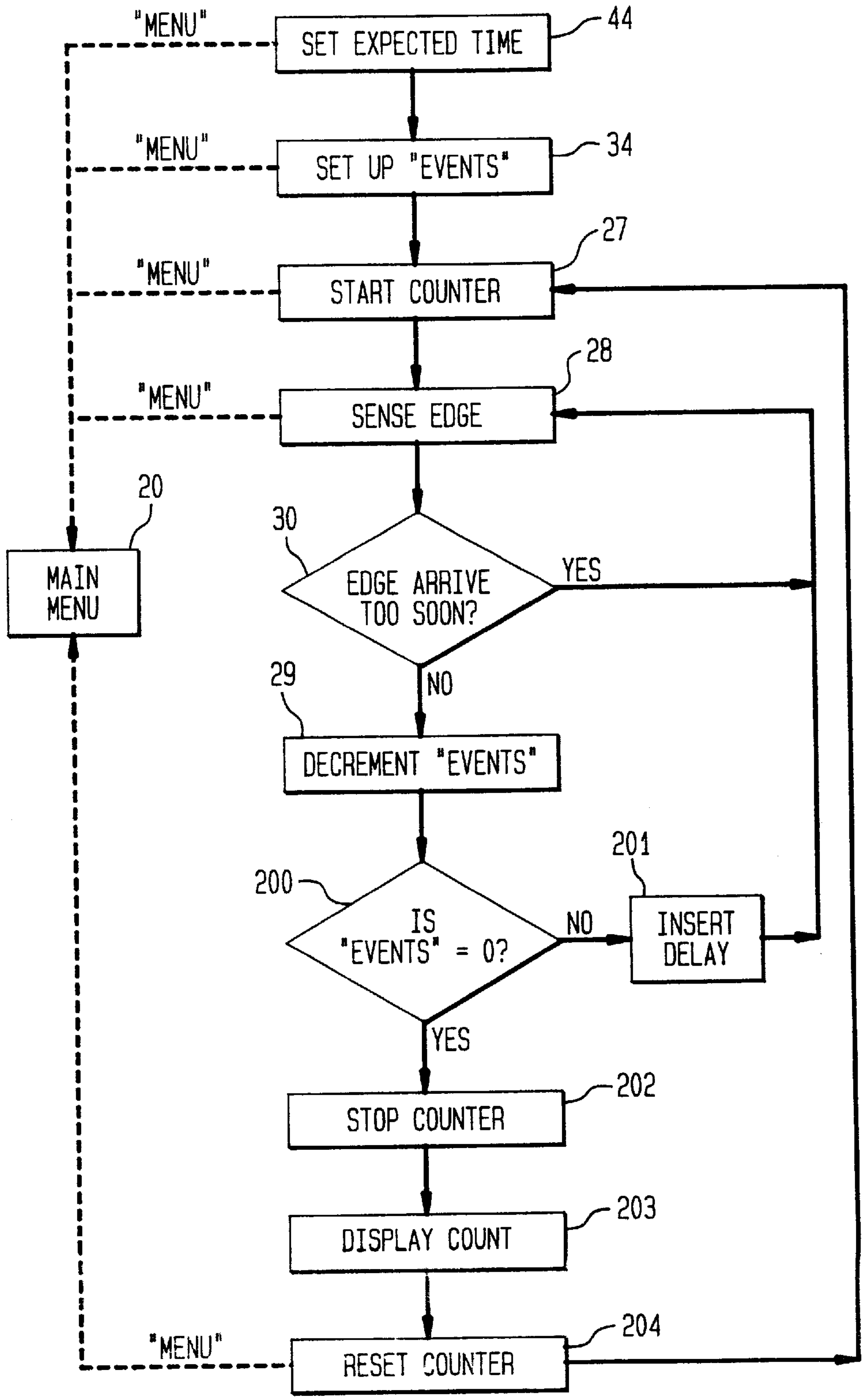
FIG. 3 is a block diagram illustrating one embodiment of the present invention.

FIG. 3 is a block diagram illustrating another exemplary method of the present invention for calculating the period of the pendulum of a mechanical clock. As shown in FIG. 3, the method of the invention compensates for the gain of the amplifier 14 being too high without actually adjusting the gain of the amplifier 14. When the gain of amplifier 14 is too high, the microcontroller 18 receives an excessive number of signals from the pickup 12, some of which signals are noise.

At block 44, the microcontroller 18 is programmed within an expected time interval between beats. This expected time interval can be entered by the user in main menu 20, or can be defined by appending some time interval to the delay period entered by the user.

Block 34 as shown in FIG. 3 essentially combines the steps shown in blocks 24 and 25 shown in FIG. 2 to define the "events" variable.

Blocks 27 and 28 are the same as described in FIG. 2, in which the counter is started and the edge is sensed.

At block 30, the microcontroller 18 determines whether the edge has arrived too soon, in other words, well before the expected time interval has elapsed. The microcontroller 18 ignores any sound generated by the clock until after this expected interval has nearly elapsed. The microcontroller 18 ignores sound by looping back to step 28 without decrementing the "events" variable until an edge is sensed that is near the expected time interval. In this manner, the microcontroller 18 compensates for the gain of the amplifier 14 being too high and generating an excessive number of signals by ignoring those signals that occur before the expiration of the expected time interval.

In practice, the clock restorer has a general expectation of the pendulum period of a given clock. For example, if a given clock has an expected pendulum period of about 1.0 seconds, the restorer knows any sounds sensed before about 0.8 seconds into the pendulum swing are probably noise. Thus, the restorer can set the expected time interval to be about 0.8 seconds.

When an edge is sensed after the expected time interval has expired, the microcontroller 18 proceeds to block 29 and decrements the "events" variable. Blocks 29, 200, 201, 202, 203, and 204 are the same as shown in FIG. 2.

Figure 4:
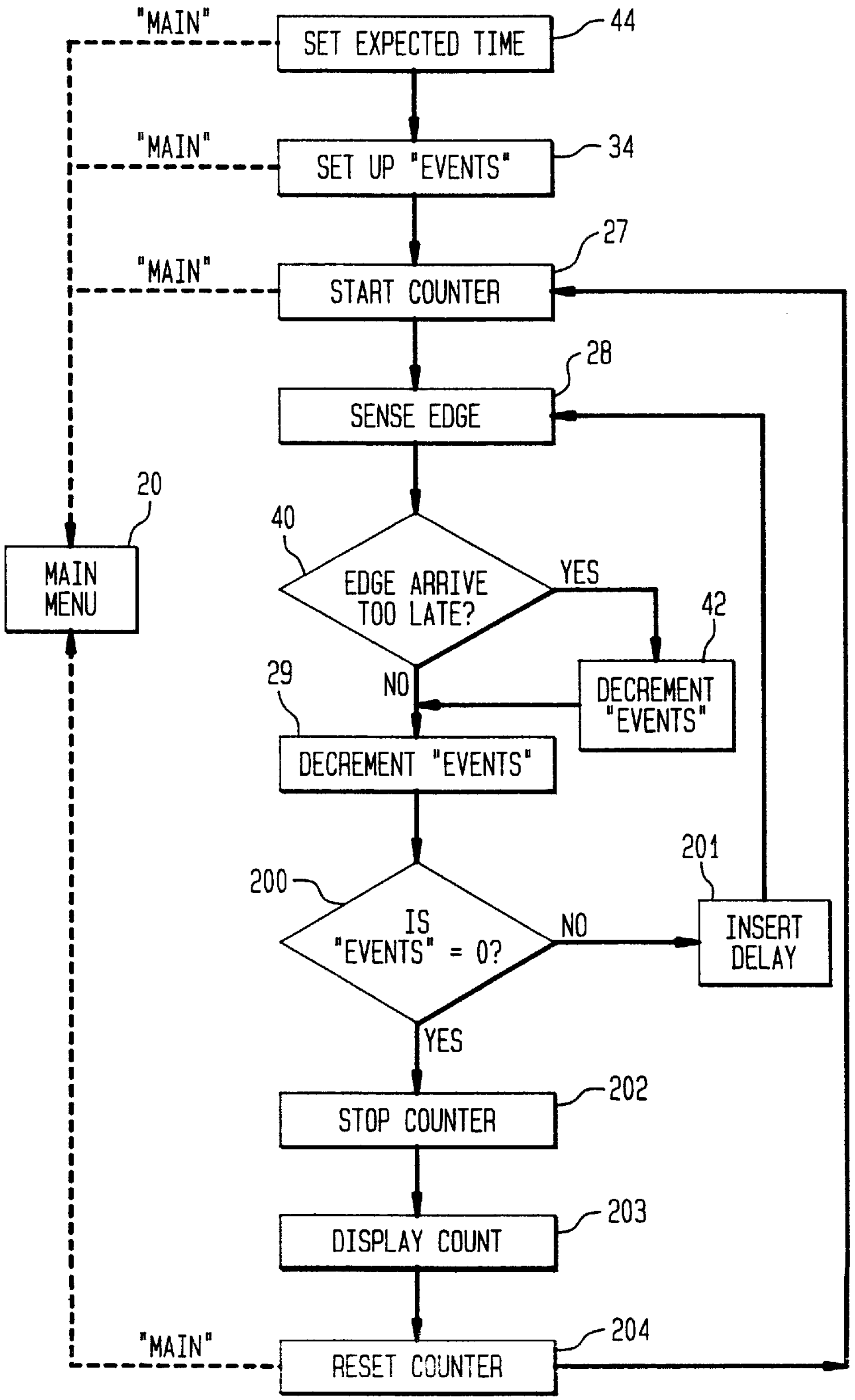
FIG. 4 is a block diagram illustrating another embodiment of the present invention.

FIG. 4 is a block diagram illustrating another exemplary method of the present invention for calculating the period of the pendulum. As shown in FIG. 4, the method of the invention compensates for the gain of the amplifier 14 being too low. When the gain of amplifier 14 is too low, an insufficient number of signals reach the microcontroller 18, and it is possible that sounds from the clock will not be sensed by pickup 12 and transmitted to microcontroller 18. FIG. 4 is similar to FIG. 3 in that all of the steps taken to calculate the period of the pendulum are the same and have similar designations 40, 42, and 44, which are described below except for the steps.

At block 44, the microcontroller 18 is programmed within an expected time interval between beats. This expected time interval can be entered by the user in main menu 20, or can be defined by appending some time interval to the delay period entered by the user. If the sound is sensed well after this expected time interval (about two times the expected time interval), then the microcontroller 18 probably missed a beat from the clock.

As shown in block 40, if the edge arrives too late, then the microcontroller 18 decrements the "events" variable to compensate for the missed beat, as shown in block 42. The microcontroller then proceeds to block 29, where the "events" variable is decremented again. Thus, when a given edge is sensed after the expected time interval, then the "events" variable is decremented a first time for the given sensed edge and a second time for the edge presumably missed because the amplifier gain was too low. When the edge does not arrive too late, the microcontroller 18 decrements the "events" variable only once, at block 29.

In this manner, the microcontroller 18 compensates for the gain of amplifier 14 being too low without actually adjusting the gain of the amplifier 14.

Figure 5:
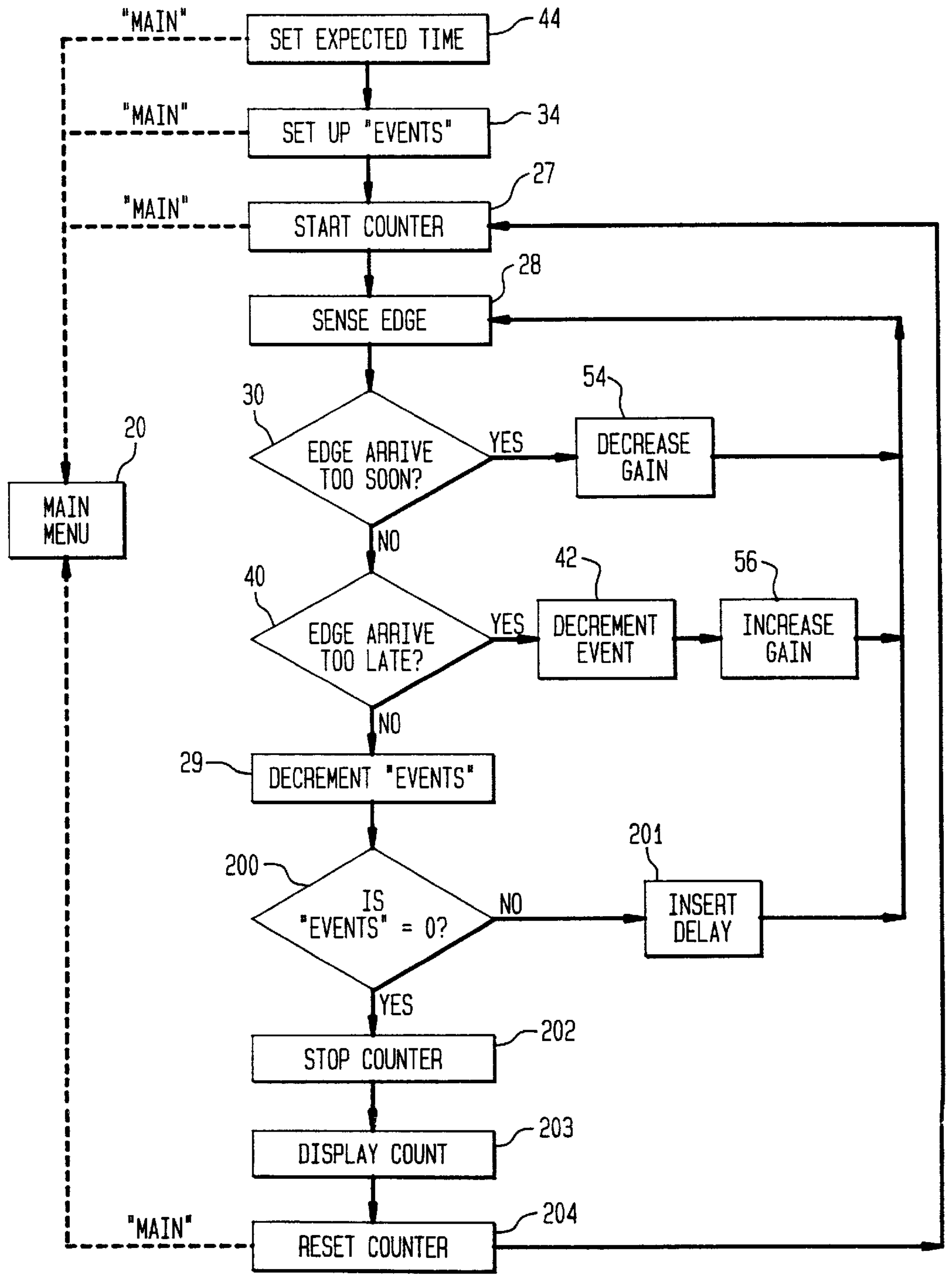
FIG. 5 is a block diagram illustrating a further alternative embodiment of the present invention.

FIG. 5 is a block diagram illustrating another exemplary method of the present invention. In this embodiment, the microcontroller 18 adjust and optimizes the gain of the amplifier 14, in addition to compensating for the gain of the amplifier 14 being too high or too low. In contrast, the methods shown in FIGS. 3 and 4 compensate for the gain of amplifier 14 without actually adjusting the gain.

Blocks 44, 34, 27, 28, and 30 are the same as set forth above in FIGS. 2, 3, and 4. At block 30, the microcontroller 18 evaluates whether the edge arrived too soon based on the expected time interval defined in step 44. If the edge arrived too soon, it is probably noise, and the microcontroller 18 decreases the gain of the amplifier 14 as shown in step 54. With its gain reduced, the amplifier 14 becomes less sensitive and effectively reduces the number of sounds input to the microcontroller 18. In th is manner, the amount of extraneous sounds input to the microcontroller 18 is reduced, thereby reducing the susceptibility of the microcontroller 18 to noise. The microcontroller 18 then loops back to block 28.

If the edge does not arrive sooner than expected, then processing control passes to block 40. At step 40, the microcontraller 18 evaluates whether the edge arrived too late. If the edge is sensed later than expected, after the expected time interval lapses, then the microcontroller 18 probably missed an edge. To ensure that future edges from the clock are sensed, the microcontroller 18 increases the gain of the amplifier 14 as shown in step 56. By increasing the gain of the amplifier 14, the microcontroller 18 makes the amplifier 14 more sensitive and effectively increases the number of sounds input to the microcontroller 18. In this manner, more sounds from the clock will be transmitted to the microcontroller 18 by the amplifier 14, thereby reducing the probability that the microcontroller 18 will miss future periodic sounds from the clock. Also, in step 42, the microcontroller 18 decrements the "events" variable to compensate for the "missed" edge.

The microcontroller 18 then loops back to block 28. If the edge is sensed neither too soon nor too late, then processing passes to step 29, where the "events" variable is decremented, as described above in FIG. 2. If the microcontroller 18 reaches block The remaining steps shown in blocks 200, 201, 202, 203, and 204 are identical to those shown in FIGS. 2, 3, and 4. The gain of amplifier 14 is adjusted by the microcontroller 18 until edges are sensed at approximately the expected time of arrival. When edges are sensed at approximately the expected time of arrival, the gain of the amplifier 14 is optimized to avoid noise and to sense each periodic sound from the clock.

Once the gain of the amplifier 14 is set at an optimum level, a blanking step may be used, during which the microcontroller 18 ignores any input from the clock. Using such a blanking step or blanking period further protects microcontroller 18 from extraneous noise occurring well outside the time intervals at which edges are expected.

Although illustrated and described herein with reference to certain specific embodiments, the present invention is nevertheless not intended to be limited to the details shown. Rather, various modifications may be made in the details within the scope and range of equivalents of the claims and without departing from the invention.

What is claimed:

1. A method of calculating the period of a pendulum of a mechanical clock, the method comprising the steps of:

(a) defining a blanking period having a duration;

(b) sensing a first sound associated with the pendulum;

(c) ignoring sound from the time that the first sound is sensed for the duration of the blanking period;

(d) sensing a second sound after the blanking period elapses, the duration between the times at which the first and second sounds are sensed defining a first half-period of the clock;

(e) sensing a third sound after the blanking period elapses, the duration between the times at which the second and third sounds are sensed defining a second half-period of the clock; and (f) calculating the period of the clock based on the durations between the first and third sounds.

2. The method of claim 1, further comprising the step of comparing the duration of the first half-period to the duration of the second half-period.

3. The method of claim 1, wherein the step of defining a blanking period includes setting a blanking period ranging from 0.1 to 25.5 seconds in 0.1 seconds increments.

4. The method of claim 1, further comprising the step of defining an events variable to count the number of sounds to be sensed from the clock.

5. The method of claim 4, further comprising the step of decrementing the events variable when a sound is sensed.

6. The method of claim 4, further comprising the step of determining that a sound has been sensed later than expected and decrementing the events variable twice.

7. The method of claim 1, further comprising the step of determining that a sound has been sensed sooner than expected and ignoring the sound.

8. A method for optimizing the gain of an amplifier configured to amplify an electronic signal representing a sound from a mechanical clock, the method comprising the steps of:

(a) setting an expected time at which a sound from the clock is expected to be sensed;

(b) sensing a sound from the clock;

(c) comparing the expected time to the time at which the sound actually arrived; and (d) adjusting the gain of the amplifier to adjust the time at which the sound is sensed.

9. The method of claim 8, further comprising the step of repeating steps (b) through (d) until the time at which the sound is sensed is approximately the same at the expected time.

10. The method of claim 8, wherein the step of adjusting the gain of the amplifier includes:

decreasing the gain when the sound is sensed sooner than the expected time; and increasing the gain when the sound is sensed later than the expected time.

11. The method of claim 8, further comprising the steps of defining an events variable; and decrementing the events variable when the second instant is approximately equal to the expected time of arrival.

12. The method of claim 8, wherein the step of adjusting the gain includes adjusting the gain within a range of values between 0 and 255.

13. An apparatus for sensing sounds associated with a mechanical clock while minimizing noise, the apparatus comprising:

a pick-up configured to receive sound from the mechanical clock and to convert the sound to an electrical signal;

an amplifier coupled to the pick-up to receive the electrical signal, and including an output terminal for providing an amplified electrical signal, the amplifier configured with an adjustable gain to control the amount by which the electrical signal is amplified;

a microcontroller coupled to the output terminal of the amplifier to receive the amplified electrical signal and coupled to the amplifier to control the gain of the amplifier, the microcontroller being configured to:

(a) define a blanking period having a duration;

(b) sense a first sound associated with the clock; and (c) ignore sound from the time that the sound is sensed for the duration of the blanking period.

(d) adjust the gain of the amplifier so that the expected time delay interval becomes approximately equal to the actual time interval, thereby minimizing noise.

14. The apparatus of claim 12 wherein the microcontroller is configured to:

(a) measure the duration of a pendulum period;

(b) calculate a theoretical pendulum period at which the mechanical clock keeps proper time;

(c) calculate the error in the elapsed time measured by the mechanical clock;

(d) calculate the amount by which to adjust the length of the pendulum so that the mechanical clock keeps proper time.

15. A method of automatically minimizing noise in sensing a period of a pendulum of a mechanical clock, the method comprising the steps of:

(a) setting an expected time at which a sound from the clock is expected to be sensed;

(b) sensing a sound from the clock;

(c) comparing the expected time to the time at which the sound was sensed; and (d) adjusting automatically the gain of an amplifier configured to amplify to adjust the time at which the sound is sensed.

16. The method of claim 15, further comprising the step of repeating steps (b) through (d) until the time at which the sound is sensed is approximately equal to the expected time.

* * * * *

UNITED STATES PATENT AND TRADEMARK OFFICE

CERTIFICATE OF CORRECTION

PATENT NO. : 6,036,358
DATED : March 14, 2000
INVENTOR(S) : Charles J. Montrose

It is certified that error appears in the above-identified patent and that said Letters Patent is hereby corrected as shown below:

Title page,
Under Item [56], References Cited, insert a new heading and three references as follows:

-- OTHER PUBLICATIONS

"TIMETRAX 150 "Best By Clock Timer," Adams Brown Co., Special Supplement: Electronics pg. 14, published in or before 1995.

"TRIMETRAX 180 Plus A-C," Adams Brown Co., Special Supplement: Electronics pg. 15, published in or before 1995.

"New Clock Timing Tool," MicroSet, Mumford Micro Systems, NAWCC Mart, July 1997. --.

Signed and Sealed this

Fourth Day of December, 2001

*Attest:*

Nicholas P. Godici

*Attesting Officer*

NICHOLAS P. GODICI
*Acting Director of the United States Patent and Trademark Office*